United States Patent [19]

Levy

[11] 4,053,269
[45] Oct. 11, 1977

[54] APPARATUS FOR FORMING A COMPOSITE TAPE

[76] Inventor: Sidney Levy, 145 W. Cuthbert Blvd., Oaklyn, N.J. 08107

[21] Appl. No.: 553,280

[22] Filed: Feb. 26, 1975

Related U.S. Application Data

[63] Continuation-in-part of Ser. No. 341,238, March 14, 1973, Pat. No. 3,917,890, which is a continuation-in-part of Ser. No. 887,990, Dec. 24, 1969, abandoned.

[51] Int. Cl.² .............................................. B29F 3/10
[52] U.S. Cl. ................. 425/113; 425/376 R; 425/461
[58] Field of Search ................ 425/113, 114, 72, 461, 425/376, 465; 264/271, 272, 273, 176 R; 156/244, 501

[56] References Cited

U.S. PATENT DOCUMENTS

| 2,077,373 | 4/1937 | Formhals | 425/461 X |
| 2,760,230 | 8/1956 | Van Riper | 425/113 |
| 2,990,576 | 7/1961 | Van Riper | 425/113 X |
| 3,359,357 | 12/1967 | Bentley, Jr. | 425/113 X |
| 3,382,535 | 5/1968 | Ferrari | 425/461 |
| 3,568,640 | 3/1971 | Kuettner | 425/113 |

*Primary Examiner*—Francis S. Husar
*Assistant Examiner*—Mark Rosenbaum
*Attorney, Agent, or Firm*—Sidney Levy

[57] ABSTRACT

Apparatus for forming a composite tape having a foraminous fiberglass core includes the step of treating a continuous strip of foraminous material with adhesion promoting and stiffening material. The treated strip is preheated to a temperature approximately equal to the extruding temperature of two ribbons of flexible vinyl thermoplastic material which are simultaneously formed in a subsequent step and coated under pressure on each side of the heated fiberglass core material through a suitably dimensioned die opening. Application of pressure forces at least portions of the extruded two ribbons into the interstices of the foraminous core material to cause the opposing ribbons to fuse to each other by penetrating and filling the interstices to form a unitary mass and to provide a textured surface or "intaglio" effect which has an appearance which is dimensionally related to the surface finish of the core material.

7 Claims, 7 Drawing Figures

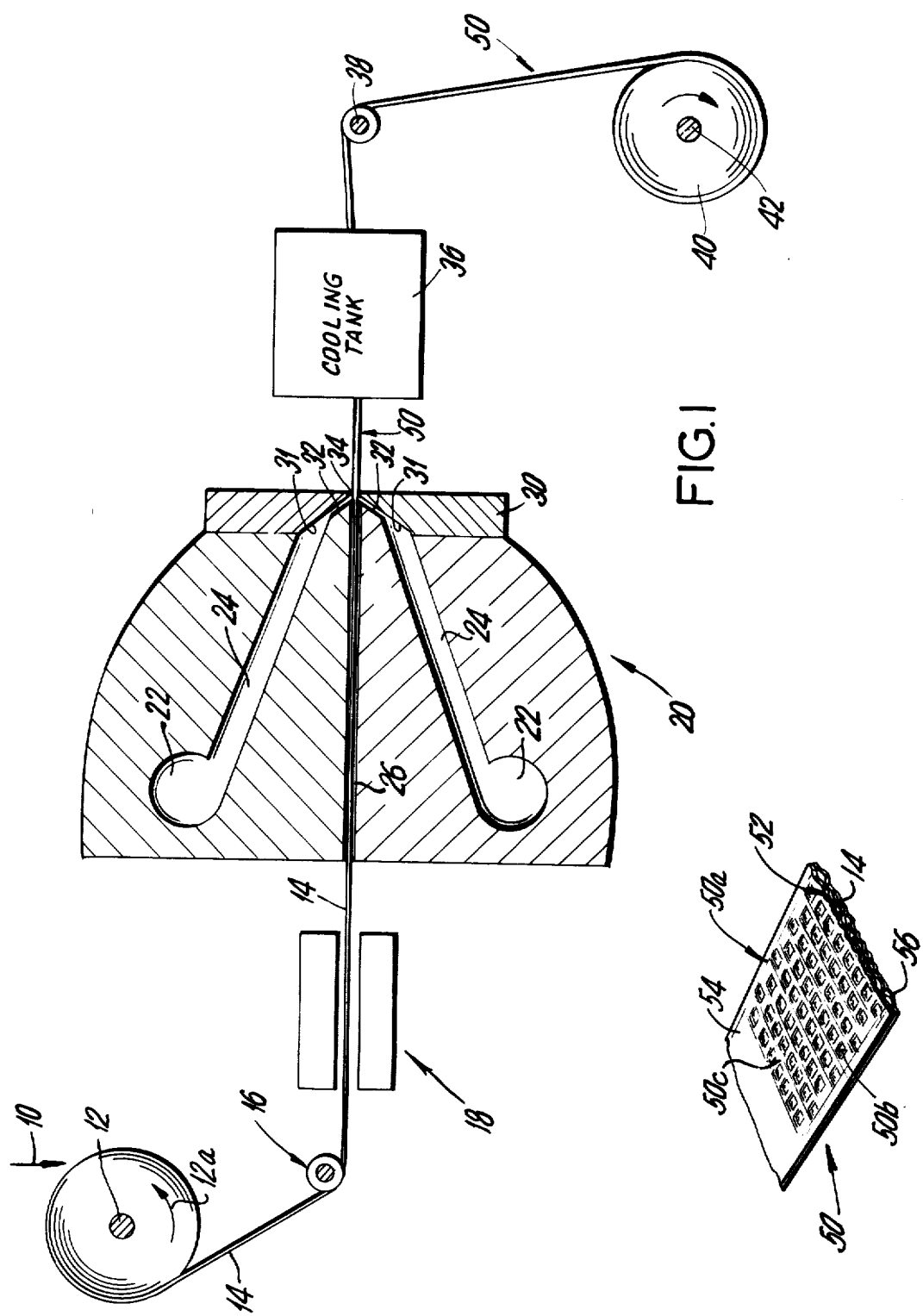

dimensions of the die lip area and the passageways to provide the composite tape in accordance with the present invention. The length of said passageways are approximately 0.25 inches and the effective dimension across the full path of the passageways is approximately 0.05 inches. The die lip area has a length along the flow path of approximately 0.015 inches and has an effective dimension across the flow path of approximately 0.02 inches. The selected dimensions of said passageways and of said exit opening permit a coating of resin material under suitable extrusion pressures to encapsulate the core material during the course of passage through the extrusion die prior to its emergence therefrom. In this manner, controlled application of pressure on the extruded resin material by selection of the extrusion die dimensions forces the resin into the interstices of the foraminous core material prior to emergence from the die orifice to impart a layer of resin material about the core material along its length.

APPARATUS FOR FORMING A COMPOSITE TAPE

CROSS REFERENCE TO RELATED APPLICATION

This application is a continuation-in-part application of my copending Application Ser. No. 341,238, filed Mar. 14, 1973, now U.S. Pat. No. 3,917,890, which is a continuation-in-part of Ser. No. 887,990, filed Dec. 24, 1969, now abandoned.

BACKGROUND OF THE INVENTION

The present invention generally relates to an apparatus of forming composite tape materials and the product resulting therefrom, and more particularly to a critically dimensioned die for forming a composite tape having a foraminous fiberglass core and the composite tape resulting therefrom.

While some composite tapes are known which have low stretch coefficients, these tapes are generally expensive to manufacture and many are inconvenient to use.

Other known tapes have low resistance to mistreatment, bending, folding and so forth and break or wrinkle with prolonged use. Some of these tapes tend to crack or take a permanent kink when the tape is mishandled. Generally, reliable tapes which are inexpensive to use, and which remain useful over prolonged use and over wide temperature ranges are not presently known. Most of the presently known tapes have low tensile strengths which further reduces their usefulness.

Many of the known tapes additionally exhibit smooth surfaces. Smooth surfaced tapes of this type are not suitable for printing since they are not abrasion resistant and the ink printed on the smooth surfaces is eradictated or rubbed out with continued use.

SUMMARY OF THE INVENTION

Accordingly, it is an object of the present invention to provide a composite tape which is not possessed of the above described disadvantages associated with prior art tapes.

It is another object of the present invention to provide a composite tape of the type under discussion which is simple in construction and economical to manufacture and has a textured surface which is abrasion-resistant and therefore suitable for printing.

It is still another object of the present invention to provide a die for forming a composite tape as above described.

It is yet another object of the present invention to provide a composite tape which is provided with a foraminous fiberglass core material coated by a flexible vinyl polymer thermoplastic material.

It is a further object of the present invention to provide a composite tape wherein the foraminous material represents an effective open area of approximately between 20 and 60% and wherein the tape is covered by a flexible thermoplastic coating which penetrates and fills the interstices of the foraminous material to form a unitary bonded mass.

It is still a further object of the present invention to provide a composite tape which has a very low stretch factor.

It is yet a further object of the present invention to provide a composite tape which comprises a fiberglass woven core material and a flexible vinyl thermoplastic outer coating and an adhesion promoting and stiffening agent between the fiberglass and the plastic coating.

It is an additional object of the present invention to provide a composite tape which may be formed on a continuous, efficient basis by simultaneously extruding two ribbons of flexible vinyl thermoplastic material on an advancing fiberglass strip of material.

It is another object of the present invention to provide a composite tape which is flexible, resistant to mistreatment, bending, folding and so forth and which does not wrinkle or crack or take permanent kinks.

It is yet an additional object of the present invention to provide an extrusion die which is dimensioned to permit encapsulation of a core material by the above suggested method to produce a composite tape which has the above-mentioned desirable characteristics and which overcomes the disadvantages of prior art tapes.

In accordance with the present invention, an extrusion die for coating a foraminous core material comprises an extrusion member having a channel extending therethrough dimensioned and configurated to substantially correspond to the external dimensions of the core material to be coated to permit passage of the core material through said channel with clearance. Said channel has an entry end and an exit end and passageway provided on each side of said channel in said extrusion member which merges with and opens into said channel proximate to said exit end where the core material leaves said extrusion member. The channel portion between the points of merging of said passageways with said channel and said exit end form a die lip area communicating with a die orifice. An important feature of the present invention are the approximate absolute range of and relative The above-mentioned dimensions for the die are for one specific embodiment which has been found to be operative and which provides composite tapes having desirable characteristics. However, as to be described in the specification, the dimensions mentioned may vary within limited ranges so long as the general dimensional ratios for the passageways and the die lip area are similarly maintained within limited ranges and as long as the dimensional ratios for the passageways and the die lip area ar maintained approximately proportional to one another.

The forming of a composite tape in accordance with the present invention includes treating a continuous strip of foraminous core material and preheating the same prior to passing the same through the above described extrusion member. The resulting composite tape is subsequently cooled to a temperature which substantially hardens the coated plastic ribbon material to provide the desired dimensional stability thereof.

An important advantage of the present die is achieved when a foraminous strip of core material is utilized. Such a core material exhibits surface irregularities or indentations of predetermined magnitudes. When the effective dimensions across the flow path of the passageways and of the die lip area are made comparable to the predetermined magnitudes of the surface irregularities of the core material, passage of the core material proximate to the passageways and through the die lip area result in effective changes in the dimensions across the flow path of the passageways and of the die lip area to thereby modify the pressures exerted on the extruded plastic material and modify the flow rates therethrough to thereby coat the core material having a textured surface which has a similar appearance to the surface indentations of the core material.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 1 is a schematic representation of the apparatus in accordance with the present invention, showing the steps of forming the composite tape from a roll of pre-treated fiberglass core material;

FIG. 4 is a perspective view of a section of the coated tape, showing the textured surface of the tape which generally has the appearance of the textured surface of the fiberglass core material;

DETAILED DESCRIPTION OF THE PREFERRED EMBODIMENTS

Figure 3:
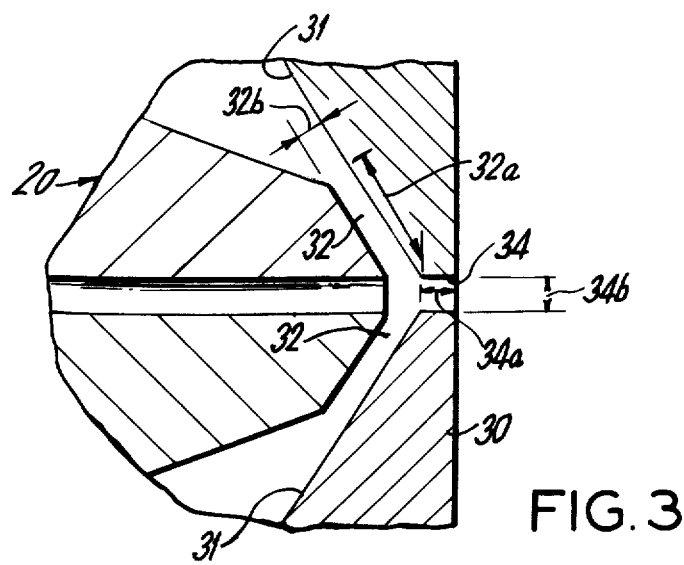
FIG. 3 is a fragmented enlarged cross section of the exit end of the die, showing the details of the channel through which the core material passes, the passageways which are inclined to and merge with the channel and the die lip area downstream of the channel where the coated tape leaves the extrusion die.

Referring now to the drawings, and particularly to FIG. 1, a schematic representation of the apparatus of the present invention is shown. A supply roll 10 is mounted on a shaft 12 for rotation in the direction of the arrow 12a. The supply roll 10 supplies a core material to be encapsulated in a later step to be described. While solid core materials may be utilized with the present invention, additional advantages to be described are achieved when a foraminous core material, such as a woven fiberglass strip 14, is used.

Figures 2, 5:
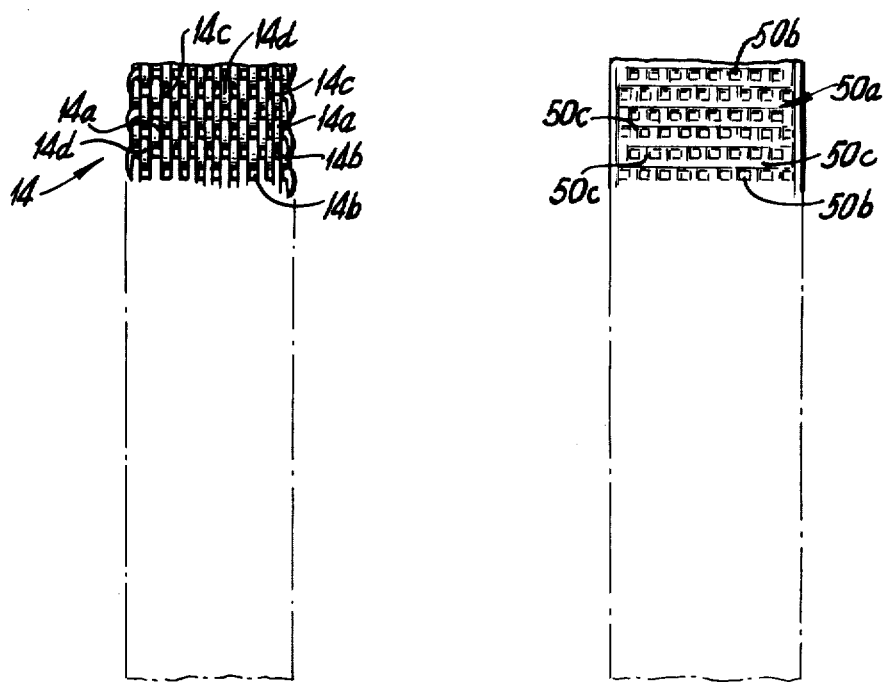
FIG. 2 is a top plan view of a section of a foraminous core material, shown in the nature of a woven fiberglass strip, which is to be coated by the apparatus illustrated in FIG. 1.
FIG. 5 is an enlarged top plan view of a section of the tape shown in FIG. 4.

Referring to FIG. 2, a section of an exemplary fiberglass woven section is shown. As with other woven materials, the strip 14 has a series of longitudinal warp threads 14a and transverse fill, weft or woof threads 14b. The woven nature of the core material 14 results in portions of reduced thicknesss or indentations 14c and portions of increased thickness 14d to form on each side or major surface of the core material 14 surface irregularities or indentations of predetermined magnitudes which are a function of the dimensions of the strands out of which the core material is woven as well as the tightness of the weave. The surface irregularities shown in FIG. 2 will be further discussed in connection with FIGS. 5 and 6.

The fiberglass tape 14 may be continuously paid off the supply roll 10—the tension in the fiberglass 14 being controlled by a tensioning idler roller 16 which may also control the feed rate at which the fiberglass 14 is advanced through the apparatus.

The fiberglass 14 paid off the supply roll 10 is advantageously pre-treated with an adhesion promoting and stiffening material, of the type to be more fully described hereafter. However, if the fiberglass tape 14 is not so pre-treated, then, according to the present invention, the woven fiberglass material 14 is first treated in a manner which will now be described. The raw fiberglass strip material is passed through a low viscosity bath of acrylic emulsion primer solution such as "Rhoplex A.C. 201", supplied by Rohm & Haas. However, any other low viscosity primers which are conventionally used to improve the adhesion between glass substrates and vinyl polymers may similaly be utilized. For example, silane-type primers which are conventionally used to improve adhesion of vinyl polymers to glass substrates have also been found satisfactory.

As mentioned above, an important characteristic of the primers, whether they be acrylic emulsion polymers or silane polymers, it that they have a relatively low viscosity. A low viscosity primer assures that the interstices of the foraminous woven fiberglass core material remain open subsequent to this treating step.

The acrylic emulsion solution is thinned, prior to treating the fiberglass material, to approximately 20% solids by weight. In the case of "Rhoplex A.C. 201", the solution is thinned from its normal 40% solids by weight.

The excess low viscosity acrylic emulsion solution is advantageously wiped off the tape to assure that the interstices in the fiberglass remain open or unfilled after treatment.

The woven fiberglass tape to be coated is, for example, 64 warp per inch by 16 fill or woof per inch. The woven fiberglass tape 14 is foraminous and has interstices or openings in its surfaces which can represent approximately between 22 to 60% of the total surface area of the fiberglass strip or tape 14. The tape in accordance with the presently preferred embodiment has an effective open area of 20%. For reasons to be described hereafter, the interstices are to be left substantially open so that the initial effective open area is not substantially reduced by the treating step. By wiping off or otherwise removing excess acrylic emulsion solution subsequent to passing the tape through a bath thereof, it is possible to substantially maintain an effective open area which is 20% or greater of the total area.

After the bath and the wiping steps, the tape is run through a radiant drying oven, or otherwise dried, to reduce the residual solvent volatiles plus water to under 10%. The evaporation of the volatiles plus water further enhances the total effective open area of the interstices and the woven fiberglass material 14. The purpose of pre-treating the fiberglass tape material is to improve the stiffness and handling ease of the tape and also to improve and promote the adhesion of the vinyl material, to be applied in a subsequent step to be described, to the fiberglass.

As described above, the fiberglass tape or strip 14 is paid off the supply roll 10 through a tension device 16 and then passed between a radiant heater 18 at which point the temperature of the fiberglass tape 14 is raised to approximately 350° plus or minus 15° F. A typical length of the radiant heaters is 36 inches. The material passes through the system at speeds that range from 50 feet per minute to approximately 250 feet per minute. To adjust for the difference in heating effect for different rates of speed, the radiant heaters are advantageously equipped with a SCR input control to control the amount of radiant energy that impinges on the woven tape. Of course, any other conventional means for heating the fiberglass may be utilized, with different degrees of advantage. The purpose of heating the fiberglass tape is to reduce the volatiles from the previous treating step to under 2%. As described in my parent application Ser. No. 887,990, the other purpose for heating the fiberglass tape is to improve the adhesion properties of the tape. More specifically, the fiberglass tape 14 is advantageously pre-heated by the radiant heater 18 to a temperature which is substantially equal to the extrusion which is substantially equal to the extrusion temperatures of the plastic coatings which are to be deposited on the tape 14, as to be described.

The preheated tape 14 is advanced through an extrusion device or member 20, the configuration and the dimensions of which form an important feature of the present invention and permit the formation of tapes having the above described advantages. The extrusion device 20 includes upper and lower manifolds 22 which communicate with associated upper and lower feeds 24. The feeds 24 are disposed to each side of a channel 26 which extends through the extrusion member 20 and is dimensioned and configurated to substantially correspond to the external dimensions of the core material 14 to be coated to permit passage of the core material through the channel 26 with clearance. The channel 26 has an entry end, at the left side of the extrusion device in FIG. 1, and an exit end at the right end thereof.

Making reference to FIG. 3, the extrusion member 20, includes a coating die plate 30 which includes tapering surfaces 31 as shown. The surfaces 31 lead to passageways 32 which converge and open into the channel 26. In FIG. 3, the passageways 32 are shown to have materially smaller dimensions than the dimensions of feeds 24. The passageways 32 form continuations of the feeds 24 and open into the channel 26 proximate to the exit end or die orifices where the core material leaves the extrusion member 20. The channel portion between the points of merging of the passageways 32 with the channel 26 at the exit end form a die lip area 34 communicating with the die orifice at the extreme right thereof as shown in FIG. 3.

The dimensions of the passageways 32 and the die lip area 34 which effect fluid flow are critical and must be included within ranges to be described below. So long as the absolute dimensions and the dimensional ratios of these fluid flow paths are maintained within the desired limits, the extrusion die assures satisfactory coating of the core material and good bonding thereto. Additionally, as to be described hereafter, dies dimensions as to be described may produce textured surfaces on the fiberglass core material when the surfaces of the core material are themselves textured. This is an advantage in certain applications of the tape, such as for printing thereon.

Still referring to FIG. 3, it will be noted that the passageways 32 are each inclined relative to the channel 26. The inclination of the two passageways 32 are such as to define the same angles with the channel, and are inclined to approach the channel 26 along successive portions of the latter in a direction from the entry towards the exit end or from the left to the right of the extrusion apparatus 20 as shown in the drawings.

Dimensions of a presently preferred embodiment which have been found to be satisfactory include a length dimension 32a of the passageways 32 which is approximately 0.25 inches and an effective dimension 32b across the flow path of approximately 0.05 inches. The effective dimension across the flow path is a parametric dimension which commonly appears in relationships for fluid flow. The depth or width of the passageways 32 in the direction into or out of the page as viewed in FIG. 3 is not critical since this dimension does not directly effect the fluid flow. Accordingly, the passageway 32 may be cylindrical in cross section or may be in the nature of an elongate slot which extends deep into the direction of the page.

With respect to the die lip area 34, the above-mentioned presently preferred embodiment has a length along the flow path of approximatey 0.015 inches and has an effective dimension 34b across the flow path of approximately 0.02 inches.

While the above dimensions are deemed critical for satisfactory operation of the present invention, they may be changed to limited degrees while still forming tapes in accordance with the present invention. The criteria for changing the dimensions will be discussed below. By selecting the dimensions of the passageways 32 and of the die lip area 34, a coating of resin material under suitable extrusion pressure may be deposited on the advancing core material 14 to encapsulate the same during the course of passage through the extrusion die 20 and prior to its emergence therefrom. In this manner, controlled application of pressure on the extruded resin material by selection of the extrusion die dimensions forces the resin into the interstices of the foraminous core material 14 prior to emergence from the die orifice of the die lip area 34 to impart a layer of resin material about the core material.

Referring again to FIG. 3, the passageways 32 may have effective dimensions across the flow paths selected within the range of approximately between 0.03 to 0.05 inches. When the length 32a of the passageways is designated by $L_1$, and the effective dimension across the flow path 32b of the passageway is denominated $D_1$, the ratio of the length $L_1$ of the passageways 32 to the flow path effective dimensions $D_1$ is advantageously selected in the range of approximately 3 to 6. Similarly, the die lip area 34 may have the effective dimension across the flow path thereof selected in the range of approximately between 0.015 to 0.3 inches. In the case of the die lip area 34, the ratio of the length 34a of the die lip area, which may be denominated by $L_2$, to the flow path effective dimension 34b, which may be designated by $D_2$, is in the range of approximately 0.5 to 1.5.

With the above limits of ranges of ratios, it should be clear that once a desired flow path length L is selected, the effective dimension across the flow path may be determined by application of the appropriate ratio.

The above preferred ranges of ratios of the effective lengths L along the flow path to the effective dimensions D across the flow path for both the passageways 32 and for the die lip area 34 are significant in that they are normalized relationships which appear in fluid flow equations. The larger the L/D ratio generally the greater pressure drop which results across the effective flow length and the slower the flow velocities. Given the L/D ratio, the pressure drops over a predetermined length flow path may be determined.

The above described L/D ratios for the passageways 32 and for the die lip area 34 have been found to be approximately proportional for providing satisfactory results. Thus, when the L/D ratio for either the orifice or for the die lip area is increased, the L/D for the other flow path should similarly be increased or decreased to maintain these ratios related by an approximately constant proportionality factor.

With the above described dimensions of a presently preferred embodiment, plastic material extruded may flow at a rate of approximately 40 pounds per hour. This plastic flow rate is suitable to coat the core material when the latter advances at a velocity of up to 400 feet per minute. The thickness of the core material 14 in the example being described is approximately 0.008 inches although the thickness of this core material may range between 0.006 to 0.012 inches. The flow velocities of the plastic material may be increased or decreased by approximately one order of magnitude by appropriate selections of the flow path dimensions. The flow rate velocities are proportional to approximately the square root of the changes in dimensions.

An extrusion die 20 provided with the above-mentioned dimensions encapsulates the core material with minimum distortions. If the L/D's are selected to be too large, there is too much pressue generated at the entry point and excessive pressure fluctuations result along the flow path. Similarly, if the L/D ratios are selected to be too small, similar pressure fluctuations and undesirable distortions along the web result.

Dispensing of the plastic onto the core material should be performed at a rate which minimizes the distortion but which at the same time insures good adhesion to the core material. It has been found that a satisfactory pressure range of plastic extrusion is in the order of between 500 to 2000 pounds per square inch of coated surface, with a suitable value being in the order ot 1000 pounds per square inch. If plastic is dispensed at a higher rate than the above-mentioned range, excessive distortion results and the coating is not uniform. On the other hand, if too little plastic is dispensed, less than the above suggested amounts, little or no adhesion results and the ribbons or strips which are extruded onto the core material do not remain adhered to the core material with extended use.

The thermoplastic which is to be applied in the extrusion process may be any flexible vinyl resin compound. Such materials will be referred to in the specification as well as in the claims as plastics. Examples of suitable resins which are suitable include polyvinyl chloride, polyvinyl chloride-acetate, polyvinyl dichloride and polyvinylidene chloride. These resins are typically rigid, however, and plasticizers must be added to make the same flexible. Stabilizers, color and other required additives are also frequently added to the basic resin to provide desired qualities. One example of a suitable vinyl plastic is that supplied by B. F. Goodrich Chemical Co. and known as "Geon 8372". The "Geon" resin is extruded into and through the die at the normal processing temperatures which can vary from 310° to 370° F. The exact temperature selected depends on the operating rate of the machine and the wetting characteristics of the particular batch run but are within the normal recommended range for this particular material. Advantageously, the above-mentioned plasticizers are non-migratory. A non-migratory plasticizer will be defined for the purposes of the specification as well as for the claims, as a plasticizer which does not leach out or flow out or otherwise separate from the vinyl resin material. Such flow or migration may result in the plasticizers reaching the interface where the bond is formed. Such migration of the plasticizers frequently weakens the adhesion bond. By eliminating plasticizer migration, the plasticizers also do not enter the primer material and the latter retains its desired characteristics. The use of a vinyl plastic as described assures that the product quality remains high after extended use.

As the pre-treated fiberglass tape 14 advances through the die opening 33, two ribbons, strips or sheets of the "Geon" resin or vinyl plastic material is extruded onto the tape. Each side of the heated fiberglass core material is coated with one of the respective ribbons. By forcing the now coated fiberglass material through a restricted die lip area 34, the coated fiberglass strip is progressively compressed. The step of progressively compressing the coated core material causes portions of the opposing ribbons to be forced into the interstices or openings of the woven foraminous fiberglass core material. The extruded ribbons or sheets of plastic material, still in a soft state, are thereby caused to penetrate and fill the interstices from opposite sides. The die lip area 34 is so selected as above described so that sufficient pressures are applied to the coated woven fiberglass material and the two opposing strips of extruded plastic so that the latter are bonded to each other by penetrating and totally filling the interstices to form a unitary mass. In this connection, it should be mentioned that preheating of the treated strip in the radiant heater 18 assures that such bonding takes place between the two ribbons by substantially maintaining the extrusion temperatures of the strips so that the latter do not prematurely harden.

With dimensions of the flow paths through the die as suggested above, the irregularities or indentations in the surface of the core material 14 may be comparable or on the same order of magnitude as the effective dimensions across the flow path of the passageways 32 and the exit opening 34. The degree of surface irregularities is, as mentioned above, a function of the nature of the strands utilized to make the fiberglass core as well as the tightness of the weave. However, when the effective dimensions across the flow path of the passageways and the exit opening are comparable to the magnitude of the indentations in the core material, passage of the core proximate to the passageways and through the exit opening results in effective changes in the dimensions across the flow paths of the passageways and the die lip area 34 to thereby modify the pressures on the plastic material being extruded and modify the flow rates therethrough. The result of such changes in the effective dimension across the flow path in a successive or repetitive manner with the advancing core material changes the flow rates through the flow paths to thereby coat the core material with more or less plastic to form a textured surface 50a which generally follows the surface indentations or irregularities of the original core material 14, as shown in FIG. 5. The thicker or heavier the web, the greater the variations in the effective flow path dimensions and the more pronounced are the surface corrugations of the coated tape. Thus, for a substantially fixed flow rate, increases in thickness of the web increases the corrugation effect. When the flow rate is increased, with a fixed web thickness, the corrugations or surface irregularities are decreased. The degree of corrugations in the resulting web is approximately inversely proportional to the web thickness. Additionally, the coarser the web or the greater the surface irregularities of the core material, the more pronounced the resulting corrugations.

Figure 6:
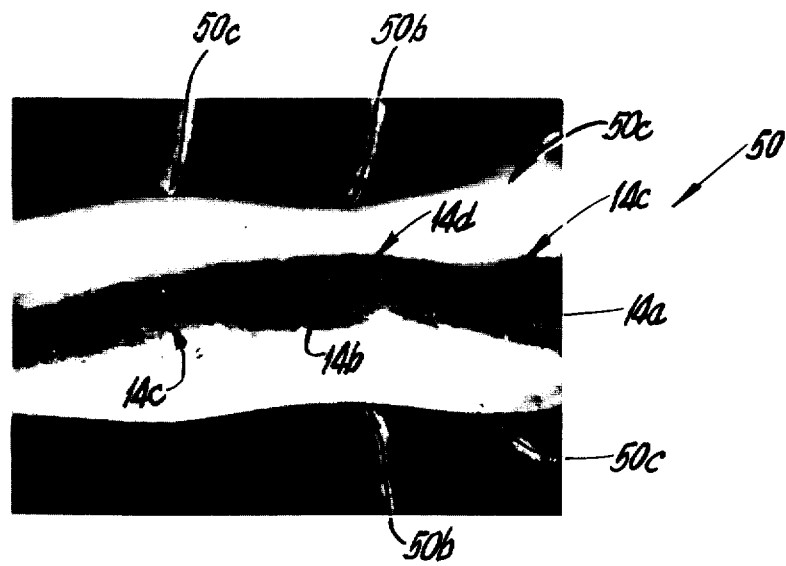
FIGS. 6 and 7 are enlarged photomicrographs, magnified 65 times, of cross sections and the tape shown in FIG. 5, when the tape is cut along a vertial length along line 6—6 and 7—7.
Figure 7:
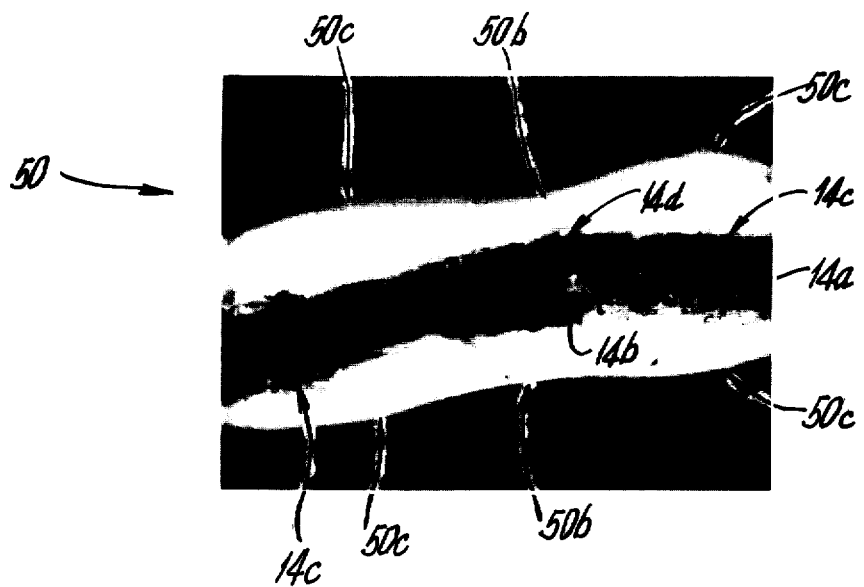

The above described corrugations or surface irregularities 50a of the finished tape are shown in the photomicrographs in FIGS. 6 and 7. Thus, in those areas 14d where fill threads or strands are present, and the resulting thickness of the core material is increased, there results an indentation 50b or decrease in thickness in the finished web 50. On the other hand, at locations 14c between fill threads, where the thickness of the core material is reduced, there appears peaks 50c in the plastic coating. Thus, surface irregularities 50a have an overall similar appearance to those of the original core material 14. This "intaglio" effect which produces the surface irregularities or a textured surface 50a on the two sides of the coated web is advantageous for printing, for example, when these tapes are utilized in making tape measures. In this application, the ink is at least partially received within the plastic coating indentations 50b. The texturized nature of the finished composite tape 50 is abrasion resistant and the printed information on such composite tape is not easily removed even with extended use.

The spreading or thickness equalization of the vinyl ribbons causes the excess vinyl to be distributed to the sides of the fiberglass tape 14, where further bonding takes place between the opposing vinyl ribbons. In this manner, the fiberglass tape 14 becomes fully enclosed encapsulated by the protective vinyl plastic.

After passing the coated fiberglass tape through the die orifice of the die lip area 34, the composite material is advanced through a cooling tank 36 where it is quenched to essentially room temperature. Such quenching hardens the vinyl material and fixes the bonds between the two opposing vinyl ribbons and between the ribbons and the pre-treated fiberglass tape.

The cooled and now completed composite tape may be wound by way of an idler roller 38 onto a takeup roll or spool 40 which is mounted in a conventional manner on a shaft 42.

Referring to FIG. 4, the finished coated tape 50, is illustrated. The composite tape 50 thereby comprises the fiberglass core material 14 surrounded by and substantially enclosed by a plastic coating or layer 52. The coating 52 generally comprises an upper ribbon 54 and a lower ribbon 56 respectively formed in the upper and lower portions of the extruding device 20. The progressive compression step through die lip area 34 forces, as described above, the upper and lower ribbons 54, 56 to penetrate the interstices of the fiberglass tape material 14 as well as to flow over the sides or edge portions of the fiberglass tape 14. For this reason, the die lip area 34 should advantageously have a width which is somewhat greater than the width of the fiberglass tape 14. Such increased width permits the upper and lower ribbons to flow around the edges of the fiberglass without causing the latter to become warped and also allows some freedom of movement of the fiberglass tape 14 through the die lip area as it advances through the latter.

The composite tape manufactured in accordance with the above description of the present invention has improved characteristics which overcome many of the disadvantages described in the Background of the Invention associated with presently known composite tapes. For example, the stretch coefficients of the tapes according to the present invention is substantially a function of the stretch coefficient of the core material itself. By utilizing core materials which have relatively low stretch coefficients, such as woven fiberglass, very low stretch coefficients can be obtained. A composite tape utilizing a fiberglass core material having a 64 per inch warp and 16 per inch fill has a stretch coefficient essentially under 1%, under normal conditions. Similaly, the strength of the tape is a function of the strength of the core material. The test strength of the particular configuration under discussion is something in the order of 100 pounds. This, of course, is well in excess of the tensions that such tapes are normally subjected.

Another important feature of the present invention is the resistance of the resulting composite tape 50 to mistreatment, bending, folding and so forth. The tape does not wrinkle, or crack or take permanent kinks. Of equal importance is the facility in which the resulting tapes are imprinted. The printing remains permanent because it becomes integrally fused to the vinyl material 52 and is at least partially received within the indentations 50b of the textured surface 50a.

Other characteristics of the tape are equally advantageous for consumer or professional use. Thus, the composite remains flexible at temperatures down to minus 40° F and it is probably useful to temperatures in excess of 160° F.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

I claim:

1. An extrusion die for coating a foraminous core material comprising an extrusion member having a channel extending therethrough dimensioned and configurated to substantially correspond to external dimensions of the core material to be coated to permit passage of the core material through said channel with clearance, said channel having an entry end and an exit end, a passageway provided on each side of said channel in said extrusion member which merges with and opens into said channel proximate to said exit end and a die orifice where the core material leaves said extrusion member, a section disposed on one side of and adjacent to a point of merging of said passageways with said channel at said exit end, said section providing a die lip area communicating with said die orifice on an opposite side thereof, said passageways having lengths of approximately 0.25 inches with an effective dimension across their flow path being approximately 0.05 inches, said die lip area having a length along the flow path of approximately 0.015 inches with an effective dimension across the flow path of approximately 0.02 inches, said dimensions of said passageways and of said die lip area permitting a coating of resin material under suitable extrusion pressures to encapsulate the core material during the course of passage through the extrusion die and prior to its emergence therefrom, whereby controlled application of pressure on the extruded resin material by selection of the extrusion die dimensions forces the resin material into interstices of the foraminous core material prior to emergence from the die orifice to impart a layer of resin material about the core material.

2. An extrusion die as defined in claim 1, wherein said die lip area has an effective dimension across the flow path in the range of approximately between 0.015 to 0.3 inches and has ratio of said length of said die lip area to said flow path effective dimension in the range of approximately 0.5 to 1.5.

3. An extrusion die as defined in claim 1, wherein each passageway and said die lip area have lengths and effective dimensions across the flow paths and wherein the corresponding ratios of said lengths to said effective dimensions across the flow paths for said passageways and for said die lip areas are related by an approximately constant proportionately factor.

4. An extrusion die as defined in claim 1, wherein said effective dimensions across the flow path of said passageways and of said die lip area are comparable to predetermined magnitudes of surface irregularities and indentations exhibited by the foraminous core material, whereby effective changes in said dimensions across the flow paths of said passageways and of said die lip area are effected by passage of the core material proximate to said passageways and through said die lip area to thereby modify the pressures on the plastic material being extruded and modify the flow rates therethrough to thereby coat the core material with a textured surface which has a similar appearance to the surface indentations of the core material.

5. An extrusion die as defined in claim 1, wherein each passageway is inclined relative to said channel.

6. An extrusion die as defined in claim 5, wherein said passageways each define the same angle with said channel and are inclined to approach said channel along successive points of the latter in the direction from said entry towards said exit ends.

7. An extrusion die as defined in claim 1, wherein said passageways have effective dimensions across the flow paths in the range approximately between 0.03 to 0.05 inches and have ratios of said lengths of said passageways to said flow paths effective dimensions in the range of approximately 3 to 6.

* * * * *